(12) United States Patent
Yoshino et al.

(10) Patent No.: US 10,001,170 B2
(45) Date of Patent: Jun. 19, 2018

(54) ROLLING BEARING

(71) Applicant: NTN CORPORATION, Osaka (JP)

(72) Inventors: Masato Yoshino, Kuwana (JP); Yuushi Onda, Duesseldorf (DE); Naoya Okamoto, Kuwana (JP)

(73) Assignee: NTN CORPORATION, Osaka (JP)

( * ) Notice: Subject to any disclaimer, the term of this patent is extended or adjusted under 35 U.S.C. 154(b) by 0 days. days.

(21) Appl. No.: 15/584,419

(22) Filed: May 2, 2017

(65) Prior Publication Data
US 2017/0234367 A1 Aug. 17, 2017

Related U.S. Application Data

(63) Continuation of application No. PCT/JP2015/080707, filed on Oct. 30, 2015.

(30) Foreign Application Priority Data

Nov. 13, 2014 (JP) ................... 2014-230395

(51) Int. Cl.
F16C 33/66 (2006.01)
F16C 33/58 (2006.01)
(Continued)

(52) U.S. Cl.
CPC ........ F16C 33/6659 (2013.01); B23Q 11/126 (2013.01); F16C 19/16 (2013.01);
(Continued)

(58) Field of Classification Search
CPC ........ F16C 19/16; F16C 33/58; F16C 37/007; F16C 33/6659; F16C 33/6662; F16F 35/077; B23Q 11/126
(Continued)

(56) References Cited

U.S. PATENT DOCUMENTS 3,722,967 A * 3/1973 Lewis ................... F16C 19/26
384/466
5,642,946 A * 7/1997 Caillault ............... B60C 23/003
384/477
(Continued)

FOREIGN PATENT DOCUMENTS

DE 102014224710 A1 * 6/2016 .......... F16C 33/6622
EP 1906037 A2 * 4/2008 ............. F16C 33/58
(Continued)

OTHER PUBLICATIONS

International Search Report dated Feb. 2, 2016 in corresponding International Application PCT/JP2015/080707.
(Continued)

Primary Examiner — Marcus Charles

(57) ABSTRACT

A rolling bearing includes an inner ring and an outer ring which are bearing rings; a plurality of rolling elements interposed in a rollable manner between raceway surfaces of the bearing rings; and a retainer configured to retain the plurality of rolling elements. Nozzles configured to inject a cooling fluid (R) toward the rolling elements are provided to a fixed-side bearing ring which is one of the inner ring and the outer ring, with an outlet side of each of the nozzles oriented forward in a revolution direction of the rolling elements.

3 Claims, 4 Drawing Sheets

(51) Int. Cl.
  *F16C 37/00* (2006.01)
  *F16C 19/16* (2006.01)
  *B23Q 11/12* (2006.01)

(52) U.S. Cl.
  CPC ............ F16C 33/58 (2013.01); F16C 37/007 (2013.01); F16C 33/6662 (2013.01)

(58) Field of Classification Search
  USPC ....... 384/462, 467–468, 475, 489, 535, 581; 277/573–574, 590, 641
  See application file for complete search history.

(56) References Cited

U.S. PATENT DOCUMENTS

| | | | | |
|---|---|---|---|---|
| 6,227,713 | B1 * | 5/2001 | Neder | ................... B21B 31/07 384/475 |
| 7,431,510 | B2 * | 10/2008 | Schott | ................... F16C 19/184 384/462 |
| 8,388,232 | B2 * | 3/2013 | Iida | ................... F16C 27/066 277/574 |
| 9,541,137 | B2 | 1/2017 | Mori et al. | |
| 2006/0239598 | A1 * | 10/2006 | Matsuyama | ......... B23Q 11/122 384/462 |
| 2013/0202237 | A1 * | 8/2013 | Kosugi | ................... F16C 33/58 384/474 |
| 2015/0226266 | A1 | 8/2015 | Mori et al. | |
| 2017/0051790 | A1 | 2/2017 | Mori et al. | |

FOREIGN PATENT DOCUMENTS

| | | | | |
|---|---|---|---|---|
| JP | 2000-161375 | | 6/2000 | |
| JP | 2002155957 | A * | 5/2002 | |
| JP | 2008075738 | A * | 4/2008 | |
| JP | 2009-138897 | | 6/2009 | |
| JP | 2010090915 | A * | 4/2010 | ............. F16C 33/583 |
| JP | 2011027083 | A * | 2/2011 | ............. F16C 33/583 |
| JP | 5394157 | B2 * | 1/2014 | ............. F16C 33/583 |
| JP | 2014-62616 | | 4/2014 | |
| JP | 2014-62618 | | 4/2014 | |

OTHER PUBLICATIONS

English Translation of the International Preliminary Report on Patentability dated May 26, 2017 in corresponding International Patent Application No. PCT/JP2015/080707.

* cited by examiner

ROLLING BEARING

CROSS REFERENCE TO THE RELATED APPLICATION

This application is a continuation application, under 35 U.S.C. § 111(a), of international application No PCT/JP2015/080707, filed Oct. 30, 2015, which claims priority to Japanese patent application No. 2014-230395, filed Nov. 13 2014, the entire disclosure of which is herein incorporated by reference as a part of this application.

BACKGROUND OF THE INVENTION

Field of the Invention

The present invention relates to rolling bearings to be used for supporting a main shaft of a machine tool, for example.

Description of Related Art

In main shaft devices of machine tools, temperature increase in the device needs to be suppressed at a small level in order to ensure machining precision. However, in recent machine tools, there is a trend of increasing the speed thereof in order to improve machining efficiency, and the amount of heat generated from bearings supporting the main shaft is on the increase, associated with the increased speed. In addition, there are an increasing number of so-called motor-built-in type devices in which a driving motor is incorporated. Such a configuration also serves as a factor that causes heat to be generated in the device.

Heat generation during bearing rotation causes increase in the contact surface pressure between bearing rings and rolling elements, and thus increases the risk of damage of the bearing. Therefore, when trying to achieve high speed and high precision of the main shaft, temperature increase in the bearing due to heat generation is desired to be suppressed as much as possible. As means for suppressing temperature increase in the bearing, there is a technique of injecting a cooling fluid composed of a mixture of air and oil or composed of only air, to a bearing in operation, thereby cooling the bearing.

If the bearing cooling effect is improved by injecting such a cooling fluid to the bearing in operation, the bearing can operate at a faster speed. However, near the revolving rolling elements, an air curtain is formed by swirl flow that occurs around the axis, and if a large amount of the cooling fluid is injected toward this air curtain, collision sound occurs. This collision sound causes noise. Thus, a configuration is employed in which a nozzle configured to inject the cooling fluid is tilted forward in the rotation direction of the main shaft, thereby trying to reduce such noise (for example, Patent Documents 1 and 2).

RELATED DOCUMENT

Patent Document

[Patent Document 1] JP Laid-Open Patent Publication No. 2014-062616

[Patent Document 2] JP Laid-Open Patent Publication No. 2014-062618

Each of the bearing devices according to Patent Document 1 and 2 is configured to inject a cooling fluid to the bearing from a nozzle provided at an outer ring spacer, and uses a rolling bearing in combination with the outer ring spacer. For example, in a case where the main shaft of the machine tool is to be supported by a rolling bearing, a configuration might be advantageous in which a pair of rolling bearings are disposed contiguous to each other without using a spacer, or with a spacer having a shortest possible length. However, conventionally, such a support configuration was not able to be employed.

SUMMARY OF THE INVENTION

An object of the present invention is to provide a rolling bearing that does not use a spacer or that can use a spacer having a shortest possible length, that can be efficiently cooled, and that can suppress collision sound between a cooling fluid and an air curtain formed by swirl flow that occurs near the rolling elements.

A rolling bearing of the present invention includes: an inner ring and an outer ring which are bearing rings; a plurality of rolling elements interposed in a rollable manner between raceway surfaces of the bearing rings; and a retainer configured to retain the plurality of rolling elements, wherein a nozzle configured to inject a cooling fluid toward the rolling elements is provided to a fixed-side bearing ring which is one of the inner ring and the outer ring, with an outlet side of the nozzle oriented forward in a revolution direction of the rolling elements.

According to this configuration, the cooling fluid from the nozzle provided to the fixed-side bearing ring is injected toward the rolling elements, whereby the rolling elements which are the heat generating source during bearing operation are directly cooled by the cooling fluid, and thus, the bearing can be efficiently cooled. Since the nozzle is provided with the outlet side of the nozzle oriented forward in the revolution direction of the rolling elements, the difference between a flow speed of the cooling fluid injected from the outlet of the nozzle and a flow speed of an air curtain formed by swirl flow occurring due to revolution of the rolling elements is reduced. Thus, collision sound between the air curtain and the cooling fluid can be suppressed. Since the nozzle configured to inject the cooling fluid is provided to the fixed-side bearing ring, usage without a spacer or with a spacer having a shortest possible length can be realized.

In the present invention, the cooling fluid may be a mixture of compressed air and oil. In this case, cooling of the bearing and lubrication of the bearing can be performed at the same time.

The rolling bearing of the present invention has the above-described effects, and thus, is suitable for supporting a main shaft of a machine tool. When the rolling bearing of the present invention is used for supporting the main shaft of the machine tool, the inner ring is fitted to the main shaft, and the outer ring is set in a housing. Since the rolling bearing can be singly used without using a spacer, a pair of the rolling bearings can be disposed contiguous to each other. Accordingly, the rolling bearings can be disposed in a concentrated manner at a front side of the main shaft, thereby being able to improve the rigidity of the main shaft.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

An embodiment of the present invention is described with reference to the drawings.

Figure 1:
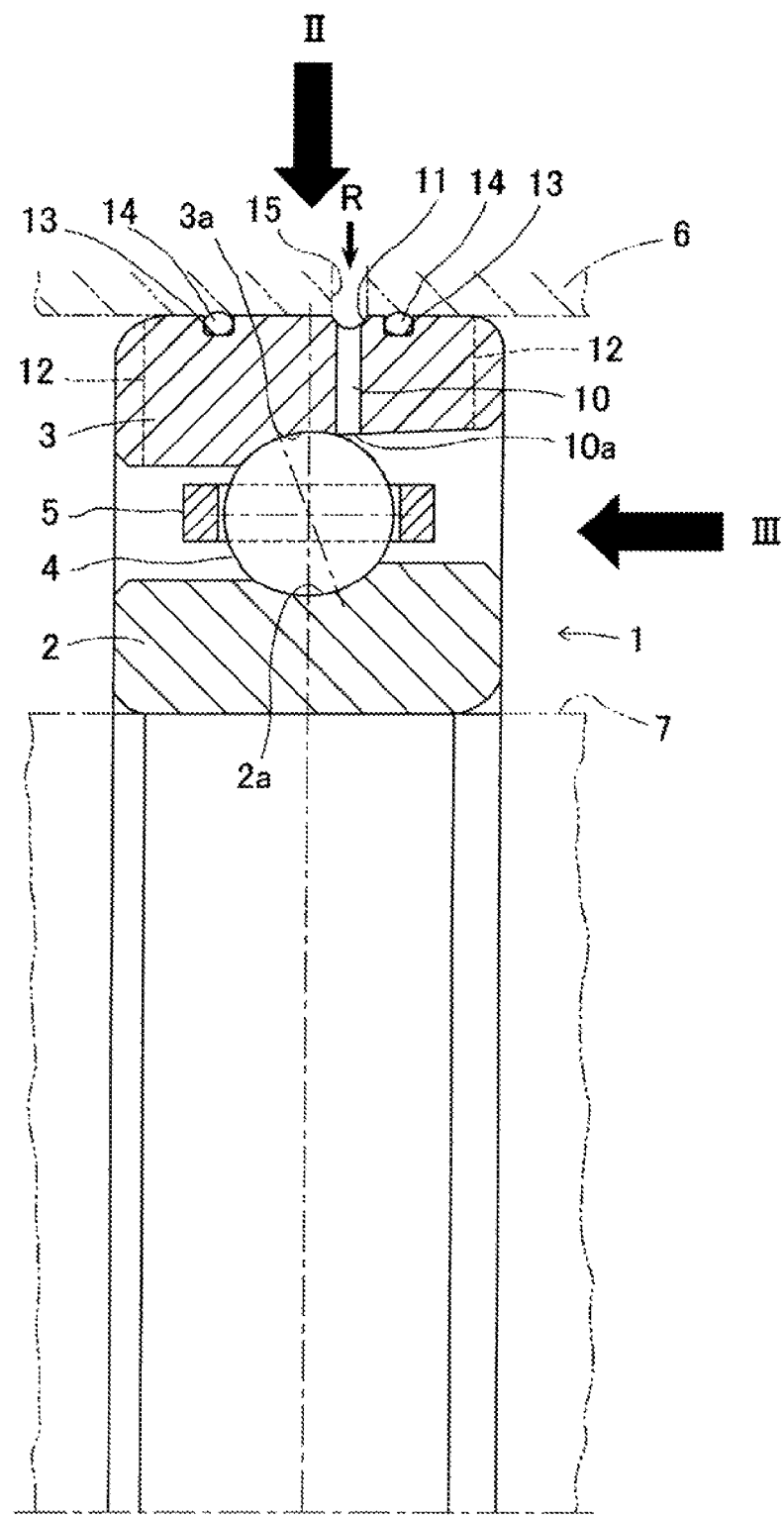
FIG. 1 is a cross-sectional view of a rolling bearing according to one embodiment of the present invention.
Figure 2:
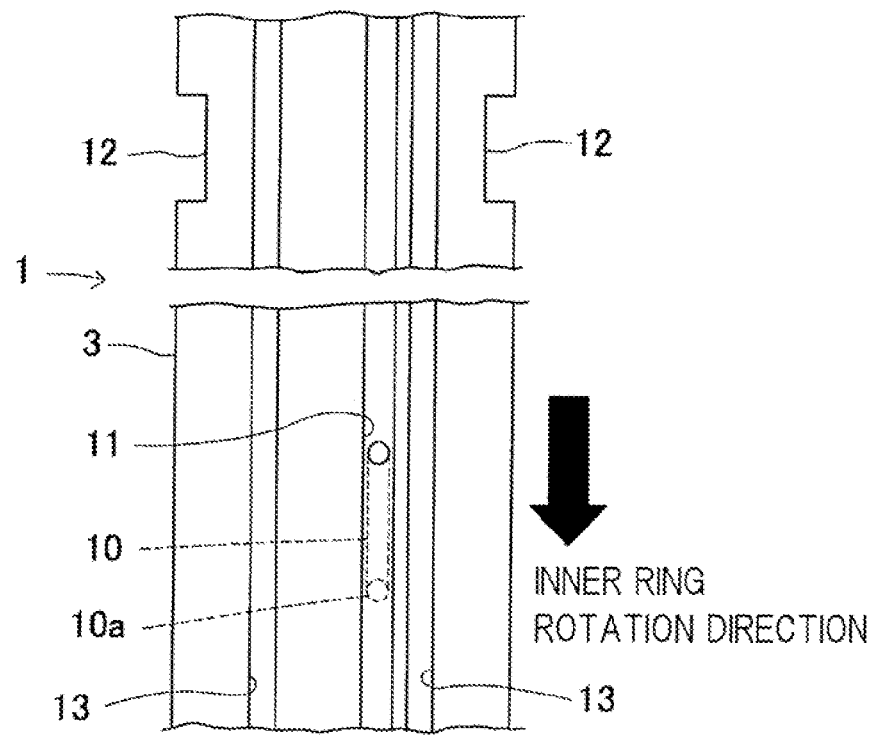
FIG. 2 is a view taken in the direction of the arrow II shown in FIG. 1.
Figure 3:
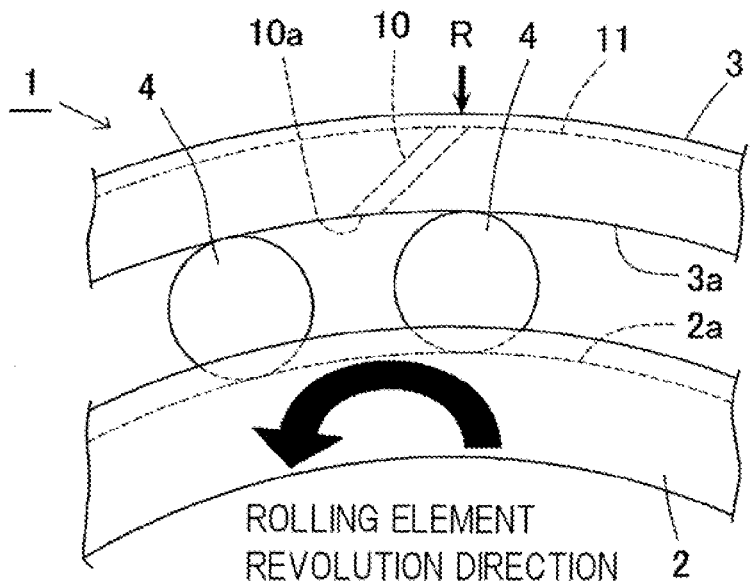
FIG. 3 is a view taken in the direction of the arrow III shown in FIG. 1.

FIG. 1 to FIG. 3 show one embodiment of the present invention. In FIG. 1, this rolling bearing 1 is an angular contact ball bearing, for example, and includes: an inner ring 2 and an outer ring 3 which are bearing rings; a plurality of rolling elements 4 interposed in a rollable manner between raceway surfaces 2a, 3a of the inner ring and outer ring 2, 3; and a retainer 5 which retains the plurality of rolling elements 4 so as to be equally spaced from one another in the circumferential direction. The rolling bearing 1 of this embodiment is used in a state where the outer ring 3 is fixed and the inner ring 2 is rotated. In this case, the outer ring 3 is set in clearance fit in a housing 6, and the inner ring 2 is in interference fit to a rotation shaft 7.

In the outer ring 3 which is the fixed-side bearing ring, a plurality of nozzles 10 each configured to inject a cooling fluid R toward the rolling elements 4 are provided so as to be equally spaced from one another in the circumferential direction. Each nozzle 10 allows the bottom of an annular groove 11 formed in the outer peripheral surface of the outer ring 3 to be communicatively connected with a portion, of the inner peripheral surface of the outer ring 3, that is slightly to the front side (right side in FIG. 1) relative to the raceway surface 3a. As shown in FIG. 2 and FIG. 3, each nozzle 10 is in a linear shape, and is tilted such that the outlet 10a side thereof is oriented forward in the revolution direction of the rolling elements 4. FIG. 1 shows a cross section that passes through the center of the nozzle 10 not a cross section of a plane that passes through the bearing center axis.

At a plurality of positions in the circumferential direction on both end faces of the outer ring 3, discharge cut portions 12 each allows the inner periphery side of the outer ring 3 to be communicatively connected with the outer periphery side thereof are provided, respectively. Further, annular seal grooves 13 are provided on both sides in the axial direction of the annular groove 11 in the outer peripheral surface of the outer ring 3. An O-ring 14 is fitted in each seal groove 13.

As the cooling fluid R, compressed air is used, for example. The cooling fluid R is supplied from a cooling fluid supply device (not shown), through a cooling fluid supply path 15 provided in the housing 6, to the annular groove 11 of the rolling bearing 1. The supplied cooling fluid R is injected from each nozzle 10 toward the rolling elements 4, to directly cool the rolling elements 4 which are the heat generating source during bearing operation. Accordingly, the rolling bearing 1 can be efficiently cooled. Since the outlet 10a side of the nozzle 10 is oriented forward in the revolution direction of the rolling elements 4, the difference between a flow speed of the cooling fluid R injected from the nozzle 10 and a flow speed of an air curtain formed by swirl flow occurring due to revolution of the rolling elements 4 is small. Thus, collision sound between the air curtain and the cooling fluid R can be suppressed.

The cooling fluid R may be a mixture of compressed air and oil. For example, air oil that carries oil in a liquid state by means of compressed air may be used, or oil mist that carries oil in a mist state by means of compressed air may be used. In such a case, cooling of the rolling bearing 1 and lubrication of the rolling bearing 1 can be performed at the same time.

Although the rolling bearing 1 shown in FIG. 1 to FIG. 3 is an angular contact ball bearing, the present invention can be applied to other ball bearings such as a deep groove ball bearing, or to roller bearings such as a cylindrical roller bearing and a tapered roller bearing.

Figure 4A:
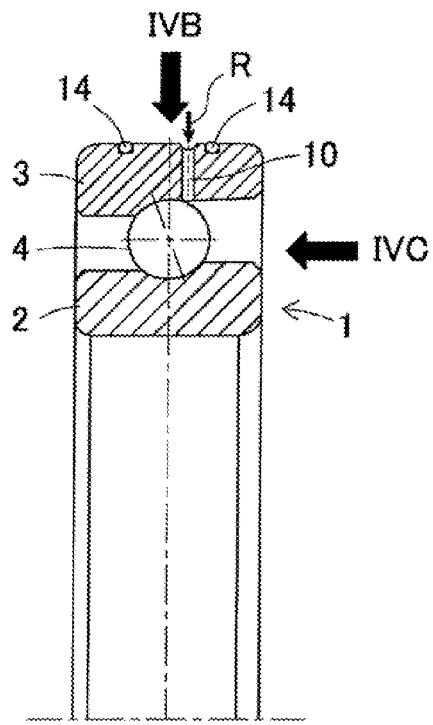
FIG. 4A is a cross-sectional view of a rolling bearing which is a comparative example.
Figure 4B:
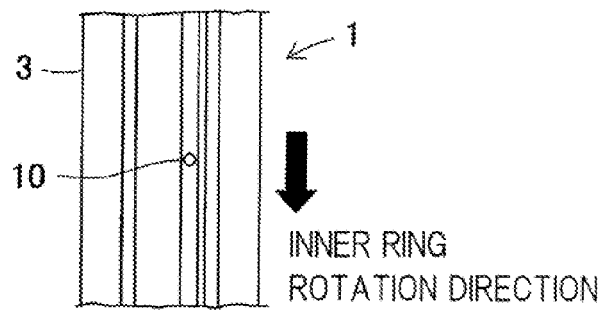
FIG. 4B is a view taken in the direction of the arrow IVB shown in FIG. 4A.
Figure 4C:
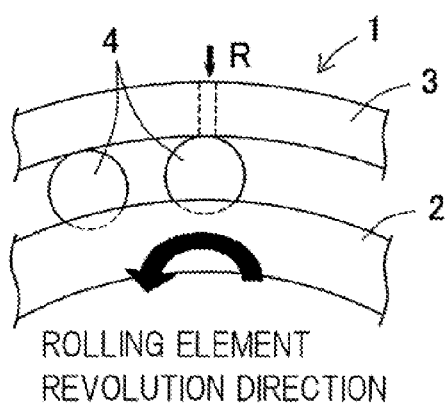
FIG. 4C is a view taken in the direction of the arrow IVC shown in FIG. 4A.
Figure 5:
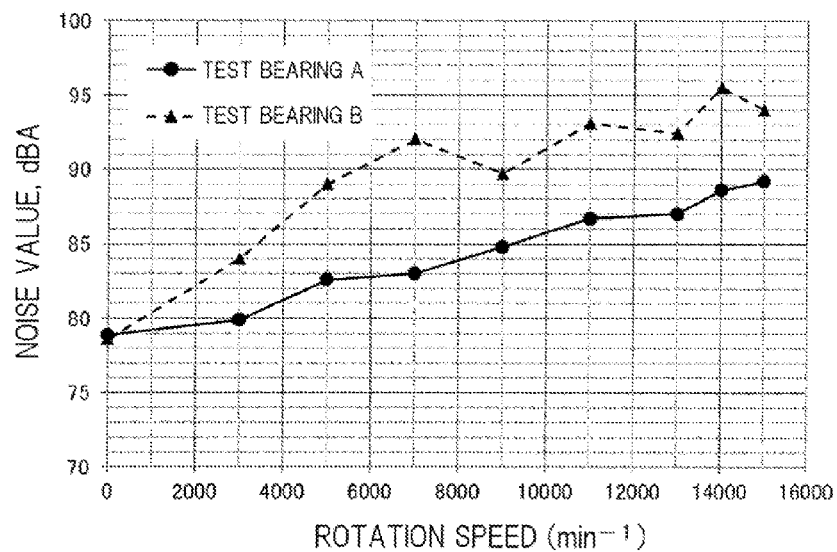
FIG. 5 is a graph showing the test result of noise value of the rolling bearing shown in FIG. 1 to FIG. 3 and the rolling bearing shown in FIG. 4A to FIG. 4C.

Noise values of a test bearing A (rolling bearing shown in FIG. 1 to FIG. 3) having the nozzle 10 tilted relative to the radial direction, and of a test bearing B (rolling bearing shown in FIG. 4A to FIG. 4C) having the nozzle 10 extending along the radial direction were measured and compared with each other. As the test bearings A, B, rolling bearings whose inner ring inner diameter was 80 mm, whose outer ring outer diameter was 125 mm, and whose width was 22 mm, and which had the nozzles 10 each having a hole diameter of 1.2 mm and provided at two positions on the circumference thereof, were used. The air amount at the test was 20 NL/min (normal•liter/min). FIG. 5 is a graph showing the test result. This graph reveals that, at any rotational speed, the test bearing A has a lower noise value than the test bearing B.

Figure 6:
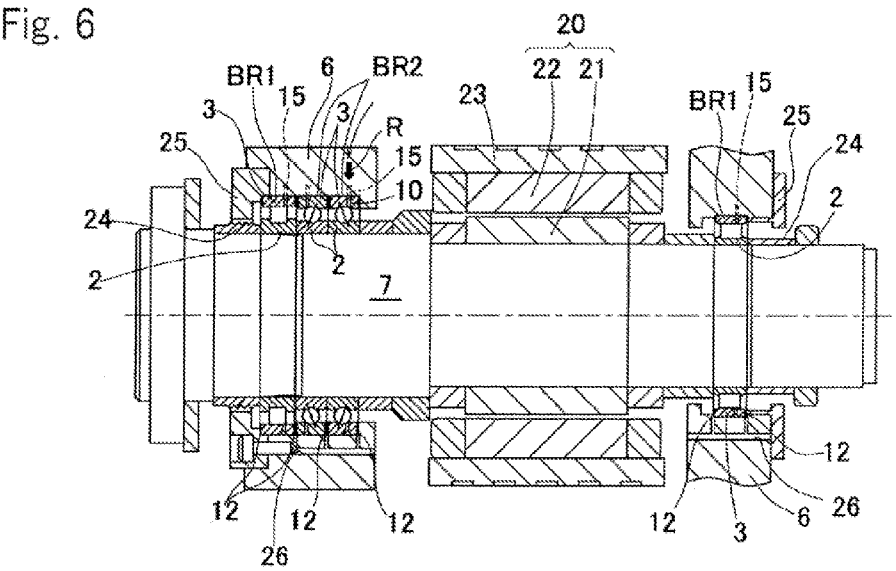
FIG. 6 is a cross-sectional view of a main shaft device of a machine tool using the rolling bearing shown in FIG. 1 to FIG. 3.

FIG. 6 shows a state in which the rolling bearing according to the present invention is used for supporting a main shaft of a machine tool. The main shaft shown in the drawing is a so-called built-in motor drive type main shaft, in which a motor is built in a housing. A rotor 21 of a motor 20 is mounted to the rotation shaft 7 serving as the main shaft, and a stator 22 of the motor 20 is mounted to the motor housing 23. The rotor 21 is composed of a permanent magnet and the like, and the stator 22 is composed of a coil, a core, and the like. The front end side of the rotation shaft 7 is supported by one cylindrical roller bearing BR1 and two angular contact ball bearings BR2 disposed with the back surfaces thereof facing each other, and the rear end side of the rotation shaft 7 is supported by one cylindrical roller bearing BR1. Each of the cylindrical roller bearings BR1 and the angular contact ball bearings BR2 is composed of a rolling bearing to which the present invention is applied.

With respect to each bearing BR1, BR2, the inner ring 2 is fitted to the outer peripheral surface of the rotation shaft 7, and the outer ring 3 is fitted to the inner peripheral surface of the housing 6. The inner rings and outer rings 2, 3 are respectively fixed to the rotation shaft 7 and the housing 6 by an inner ring retainer 24, an outer ring retainer 25, etc. The housing 6 is provided with the cooling fluid supply paths 15. Both ends of each cooling fluid supply path 15 are respectively communicatively connected with a cooling fluid supply device (not shown) and with the annular groove 11 (FIG. 1) of the rolling bearing 1 (FIG. 1) which is the bearing BR1, BR2. In addition, separately from the cooling fluid supply path 15, the housing 6 is provided with a discharge path 26 which is communicatively connected with the discharge cut portions 12 (FIG. 1) of the rolling hearing 1. The cooling fluid R injected from the nozzles 10 into the bearing passes through the discharge cut portions 12 and then through the discharge path 26, to be discharged to the outside of the housing 6.

As described above, the rolling bearing I of the present invention can be efficiently cooled by the cooling fluid R, can suppress collision sound between the cooling fluid R and the air curtain occurring near the rolling elements 4, and thus, is suitable for supporting the main shaft of the machine tool. In addition, since the nozzle 10 configured to inject the cooling fluid R is provided to the outer ring 3 which is the fixed-side bearing ring, the rolling bearing 1 can be used singly, without using a spacer. Accordingly, as in the example shown in FIG. 6, a pair of the rolling bearings 1 which are each an angular contact ball bearing can be disposed contiguous to each other. Accordingly, the bearings BR1, BR2 can be disposed in a concentrated manner at the front side of the main shaft, thereby being able to improve the rigidity of the main shaft.

The present invention can also be applied to the rolling bearing 1 whose inner ring 2 is fixed and whose outer ring 3 is rotated. In that case, the nozzle 10 configured to inject the cooling fluid R toward the rolling elements 4 is provided to the inner ring 2 which is the fixed-side bearing ring.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . rolling bearing
2 . . . inner ring
2*a* . . . raceway surface
3 . . . outer ring
3*a* . . . raceway surface
4 . . . rolling element
5 . . . retainer
6 . . . housing
7 . . . rotation shaft (main shaft)
10 . . . nozzle
10*a* . . . outlet
R . . . cooling fluid

What is claimed is:

1. A rolling bearing comprising:
   an inner ring and an outer ring which are bearing rings;
   a plurality of rolling elements interposed in a rollable manner between raceway surfaces of the bearing rings;
   a retainer configured to retain the plurality of rolling elements; and
   a plurality of nozzles configured to inject a cooling fluid toward the rolling elements provided to a fixed-side bearing ring which is one of the inner ring and the outer ring,
   wherein each of the nozzles is equally spaced from one another in the circumferential direction of the fixed-side bearing ring with an outlet side of each of the nozzles oriented forward in a revolution direction of the rolling elements, and
   a peripheral surface of the fixed-side bearing ring includes an annular groove configured to communicatively connect an inlet side of each of the nozzles.

2. The rolling bearing according to claim 1, wherein the cooling fluid is a mixture of compressed air and oil.

3. The rolling bearing according to claim 1, wherein the rolling bearing is configured to be used for supporting a main shaft of a machine tool,
   the inner ring is fitted to the main shaft, and
   the outer ring is set in a housing.

* * * * *

UNITED STATES PATENT AND TRADEMARK OFFICE
CERTIFICATE OF CORRECTION

PATENT NO. : 10,001,170 B2
APPLICATION NO. : 15/584419
DATED : June 19, 2018
INVENTOR(S) : Masato Yoshino et al.

It is certified that error appears in the above-identified patent and that said Letters Patent is hereby corrected as shown below:

On the Title Page

Item [*] (Notice), Line 13, delete "days. days." and insert -- days. --, therefore.

In the Specification

Column 1, Line 9, delete "Nov. 13" and insert -- "Nov. 13," --, therefore.

Signed and Sealed this
Fourth Day of September, 2018

Andrei Iancu
*Director of the United States Patent and Trademark Office*